R. W. E. HAYES.
DOUBLE ACTING VALVE FOR FORCE PUMPS.
APPLICATION FILED SEPT. 24, 1915.
1,189,814.
Patented July 4, 1916.
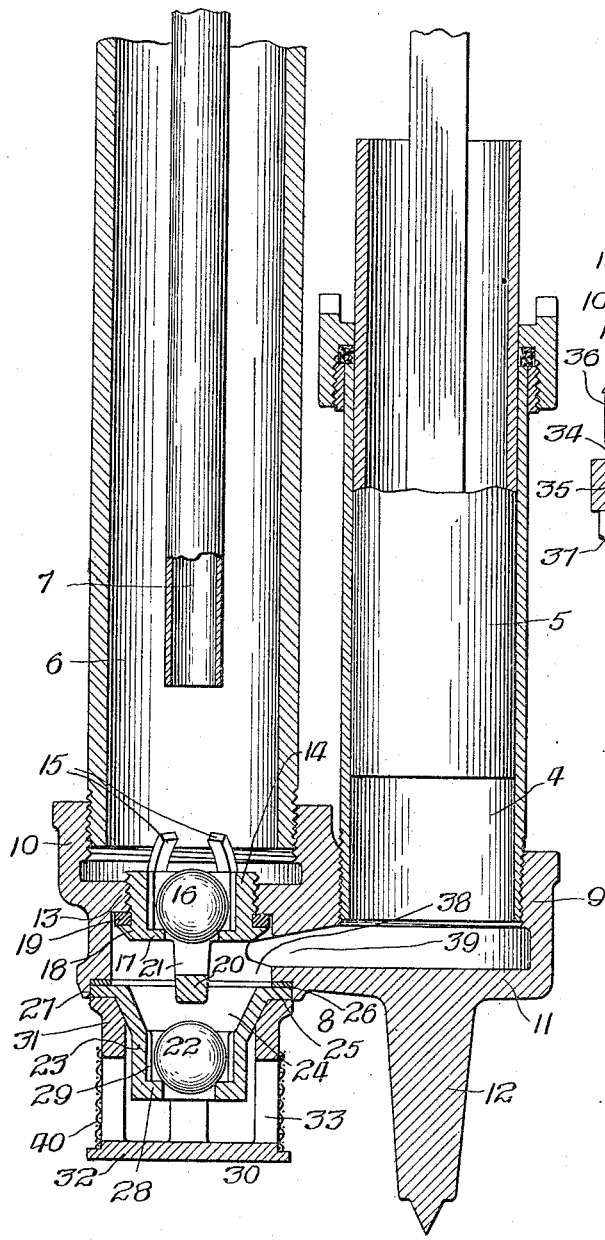
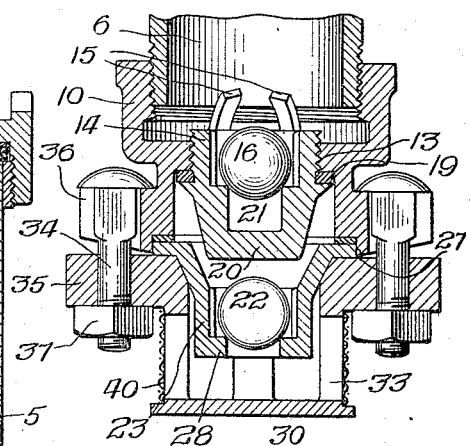
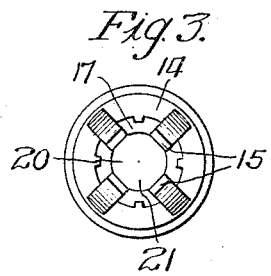
Witness:
Harry S. Gaither
Inventor
Ralph W. E. Hayes
by Banning & Banning
Attys.

UNITED STATES PATENT OFFICE.

RALPH W. E. HAYES, OF GALVA, ILLINOIS, ASSIGNOR OF ONE-HALF TO HAYES PUMP & PLANTER COMPANY, OF GALVA, ILLINOIS, A CORPORATION OF ILLINOIS.

DOUBLE-ACTING VALVE FOR FORCE-PUMPS.

1,189,814. Specification of Letters Patent. Patented July 4, 1916.

Application filed September 24, 1915. Serial No. 52,381.

*To all whom it may concern:*

Be it known that I, RALPH W. E. HAYES, a citizen of the United States, residing at Galva, in the county of Henry and State of Illinois, have invented certain new and useful Improvements in Double-Acting Valves for Force-Pumps, of which the following is a specification.

The double acting valve of the present invention is intended primarily, although not exclusively, for use in force pumps intended for hand or power sprayers.

The object of the present invention is to so mount and locate the valve members that the parts may be readily disassembled for purposes of cleaning or renewal, and so that the valve as a whole may be located in close proximity to the bottom of the pump and at a point which will enable the pump to properly act until practically the entire volume of liquid has been discharged.

Another object of the invention is to simplify and thereby cheapen the construction of the valve elements with the idea of reducing the machine work required, as much as possible, without sacrificing the efficiency of the valve.

Further objects will appear from a description of the invention, which consists in the features of construction and combinations of parts hereinafter described and claimed.

In the drawings: Figure 1 is a sectional elevation of the lower portion of a force pump containing the valve elements of the present invention; Fig. 2 is a sectional elevation of the valve elements, taken at right angles to the plane of Fig. 1; and Fig. 3 is a top or plan view of the upper valve element.

The pump in which the valve is mounted may be of any suitable type; but for purposes of illustration the pump has been shown embracing a cylinder 4, which incloses a piston 5, suitably operated by means not shown. The pump further embodies a cylindrical shell 6 inclosing an air pressure chamber, and a discharge pipe 7 located in the shell 6 and leading to a suitable point of discharge.

The cylinder 4 and shell 6 have their lower ends entered into a valve fitting 8, which is provided at one side with a threaded socket 9 to receive the cylinder 4, and is provided at the other side, and at slightly increased elevation, with a threaded socket 10 to receive the shell 6.

The socket 9 is provided with a floor 11, from which depends a supporting leg 12, upon which the pump as a whole is supported when entered into a receptacle containing a spraying solution or other liquid.

The socket 10 is provided with a cross wall 13, which is threaded to receive a valve bushing 14, preferably of brass, which projects through the cross wall, and is provided around its upper margin with inturned tongues 15, which serve to limit the upward movement of a ball 16, which, when lowered, seats upon the rim of an inturned annular flange 17. The bushing, around its lower rim, is provided with an outwardly extending flange 18, which bears against a ring-shaped leather washer 19, which is compressed against the under face of the cross wall 13 when the valve bushing is screwed into place. The bushing, below the valve opening, through its bottom, is provided with a depending cross rib 20, which is cut out at 21 to afford communication through the valve bushing, and the rib 20 serves the double function of facilitating the adjustment or removal of the valve bushing, and also serves as a stop for limiting the upward movement of a lower ball 22, which is carried by a valve cup 23. The cup, in its upper portion 24, is beveled or flared, and terminates at its upper margin in an outwardly extending lip or flange 25, which bears against a leather ring washer 26, housed within an annular recess 27 cut in the underwall of the fitting 8 to a sufficient depth to receive both the washer and the annular flange or lip 25 of the valve cup 23.

The ball 22 seats against the margin of an inturned circular flange 28, and is centered by means of vertical ribs 29 arranged at recurrent intervals around the wall of the cup.

The valve cup and associated parts are held in place by means of a guard 30 of skeletonized formation, which comprises an upper ring wall 31, a bottom or floor 32, and a plurality of legs or standards 33, which connect the floor with the top ring wall and serve to furnish a cutaway housing for the valve cup. The guard or housing is connected with the valve fitting by means of bolts 34, which are entered through tongues 35 outwardly projecting on opposite sides from the upper ring wall, the head end of each bolt being entered between a pair of ears or lugs 36 outwardly projecting from the fitting 8 and in register with the tongues 35.

In order to properly center the parts and hold them in sealed contact with one another, the lower edges of the ears 36 are slightly beveled, as shown, to the end that the pull of the bolts, when tightened by nuts 37, will be directed to the center in such a way as to cause the lip or flange 25 on the valve cup to impinge tightly against the leather packing ring 26 and compress the same into the recess 27 sufficiently to thoroughly seal the parts.

The relation of the valve members is such as to afford a valve chamber 38 intermediate the valve members, which chamber communicates through a passage 39 with the space immediately beneath the cylinder 4.

In order to prevent the ingress of grit or sediment, a screen 40 is provided which surrounds the legs 35 of the housing guard 30, immediately below the lower valve member.

The formation of the valve parts above described is one which permits the guard housing, the valve cup, and lower ball to be very quickly removed by merely loosening the nuts 37 on the bolts 34, so that these parts can be readily disassembled when it is desirable to secure access to the interior of the valve. Thereafter the bushing 14 can be unscrewed by the use of an ordinary wrench or similar tool, the cutaway rib 21 affording means for engagement of the wrench, and at the same time serving as a stop to limit the upward movement of the lower ball. The method of securing the lower valve cup and associated parts in position by draw bolts obviates the necessity for threading the parts, and at the same time simplifies the construction to a considerable extent.

By locating the lower ball valve in a cup-shaped seating member, it is possible to bring the valve into very close proximity to the extreme bottom of the pump, in order to better exhaust the contents of the receptacle into which the pump is immersed.

I claim:

1. A valve mechanism of the class described, comprising a casing, an upper valve member, a lower valve member, a seat for the upper valve member threaded into the casing, a cup-shaped seat for the lower valve member, a housing inclosing a portion of the last mentioned seat, and bolts connecting the housing with the valve casing and serving to clamp the lower valve seat in position, substantially as described.

2. A valve mechanism of the class described, comprising a casing, an upper valve member, a lower valve member, a seat for the upper valve member threaded into the casing, a cup-shaped seat for the lower valve member, a housing inclosing a portion of the last mentioned seat, bolts connecting the housing with the valve casing and serving to clamp the lower valve seat in position, and a rib-like projection depending from the upper valve seat and in form to serve as a stop to limit the movement of the lower valve member and to afford a point of engagement for a wrench or the like, substantially as described.

3. A valve mechanism of the class described, the combination of a casing, an upper valve member, a seat therefor threaded into the casing and provided with a depending rib-like projection in form to receive a wrench or the like, a lower valve member, a cup-shaped seat for the same, provided around its upper margin with an outwardly extending flange, a packing washer interposed between said flange and the surface of the casing, a housing-ring bearing against the under surface of said flange, and draw bolts connecting the housing-ring with the casing and serving to clamp the flange against the packing, substantially as described.

4. In a valve mechanism of the class described, the combination of a casing, an upper valve member, a seat therefor threaded into the casing and provided with a depending rib-like projection in form to receive a wrench or the like, a lower valve member, a cup-shaped seat for the same, provided around its upper margin with an outwardly extending flange, a packing washer interposed between said flange and the surface of the casing, a housing-ring bearing against the under surface of the flange, coöperating projections on the housing-ring and casing respectively, and draw bolts entered through said projections for uniting the parts together and clamping the cup flange against the packing-ring, substantially as described.

5. In a valve mechanism of the class described, the combination of a casing having a cross wall, an upper valve member, a seat therefor in the form of a bushing threaded through the cross wall, and provided with a flange underlying the cross wall adjacent to the bushing, a washer interposed between the cross wall and the flange to seal the bushing, a projection depending from the bushing in form to receive a wrench or the like, tongue-like projections inturned from the upper rim of the bushing to prevent excessive movement of the valve member, a lower valve member, a cup-shaped seat for the same provided around its upper margin with an outwardly extending flange, a packing interposed between said flange and the surface of the casing, a guard member bearing against the flange, and means for uniting the guard member with the casing and clamping the flange between the casing and the guard member, substantially as described.

6. A valve mechanism of the class described, comprising a casing, an upper valve member, a lower valve member, a seat for the upper valve member removably entered into the casing, a cup-shaped seat for the lower valve member, a housing inclosing a portion of the last mentioned seat, and connecting means for removably connecting the housing with the valve casing and serving to clamp and hold the lower valve seat in position, substantially as described.

RALPH W. E. HAYES.

Witnesses:
CLINTON SHURLEY,
C. K. WOODIN.

Copies of this patent may be obtained for five cents each, by addressing the "Commissioner of Patents, Washington, D. C."